United States Patent
Strässle et al.

[11] Patent Number: 6,106,183
[45] Date of Patent: Aug. 22, 2000

[54] CLAMPING DEVICE FOR RELEASABLY SECURING TWO SECTIONS

[75] Inventors: Marcel Strässle; Kurt Züllig, both of Kirchberg, Switzerland

[73] Assignee: Syma Inter Continental Ag, Kirchberg, Switzerland

[21] Appl. No.: 09/101,359

[22] PCT Filed: Dec. 16, 1996

[86] PCT No.: PCT/CH96/00440

§ 371 Date: Jul. 8, 1998

§ 102(e) Date: Jul. 8, 1998

[87] PCT Pub. No.: WO97/25536

PCT Pub. Date: Jul. 17, 1997

[30] Foreign Application Priority Data

Jan. 9, 1996 [CH] Switzerland ............................ 54/96
Apr. 22, 1996 [CH] Switzerland ............................ 1015/96

[51] Int. Cl.⁷ ..................................................... F16B 9/02
[52] U.S. Cl. ........................ 403/252; 403/257; 403/409.1
[58] Field of Search .................................... 403/252, 254, 403/256, 255, 257, 230, 217, 170, 409.1, 322.1

[56] References Cited

U.S. PATENT DOCUMENTS

| | | | |
|---|---|---|---|
| 3,574,367 | 4/1971 | Jankowski | 403/409.1 |
| 4,345,849 | 8/1982 | Stenemann | 403/252 |
| 4,787,769 | 11/1988 | Michael | 403/252 |
| 4,799,819 | 1/1989 | Swoboda | 403/252 |
| 4,983,065 | 1/1991 | Spath | 403/252 |
| 5,143,474 | 9/1992 | Vieler | 403/252 |
| 5,464,298 | 11/1995 | Schomakers | 403/252 |

FOREIGN PATENT DOCUMENTS

| | | |
|---|---|---|
| 123 683 | 11/1984 | European Pat. Off. . |
| 238 848 | 9/1987 | European Pat. Off. . |
| 371 153 | 6/1990 | European Pat. Off. . |
| 412 339 | 2/1991 | European Pat. Off. . |
| 2 152 941 | 4/1973 | France . |
| 41 19 326 | 12/1992 | Germany . |
| 42 25 926 | 2/1994 | Germany . |
| 43 28 832 | 3/1995 | Germany . |

*Primary Examiner*—Terry Lee Melius
*Assistant Examiner*—Kenneth Thompson
*Attorney, Agent, or Firm*—Sughrue, Mion, Zinn, Macpeak & Seas, PLLC

[57] ABSTRACT

The clamping device serves for the releasable connection of two profile pieces, it being possible for an insert core (1) to be introduced and fixed in a first of the profile pieces, in which insert core an axially movable slide (7) bears two pivotable clamping elements (11) each with a clamping hook (13; 14) which can be introduced at least partially into an opening of a second profile piece (15) in order to exert a clamping pressure on that section of the second profile piece (15) which partially closes off the opening. The insert core (1) has eccentric means (5) in order to displace the slide (7) axially. Two oblique surfaces (43) are provided in the insert core (1) in order to displace the clamping element transversely during its axial displacement. In addition to the clamping hook (13; 14), the clamping element (11) comprises a strip-like part with a bent-over strip end designed as hinge hook (34). The slide (7) has a flat end part (9) with a recess (10) into which the hinge hook (34) can be fitted pivotably, but with little play.

20 Claims, 7 Drawing Sheets

CLAMPING DEVICE FOR RELEASABLY SECURING TWO SECTIONS

The present invention relates to a clamping device for the releasable connection of two profile pieces in accordance with the preamble of Patent claim 1.

A clamping device of this type is known from DE-A-42 25 926. In the case of this clamping device, two clamping elements are displaced axially in order, by virtue of a system of sliding surfaces, to cause the retaining pieces to pivot during an axial movement of the bolt. The free end regions of the retaining pieces are each designed as hooks, in order to exert the desired clamping pressure during pivoting. Said clamping device, however, has the disadvantage that the two clamping hooks are subjected to loading, and exposed to forces, to different extents, with the result that, on the one hand, assembly is made difficult due to the occurrence of tilting and, on the other hand, the clamping elements exhibit play which results in increased wear. This results in it being necessary to have a generously dimensioned design and, thus, in the clamping device being of a greater thickness.

A further clamping device of this type is known from EP-B1 506 607. In the case of this clamping device, the bolt has carrying means for the pivotable mounting of a plurality of retaining pieces, each retaining piece and the inner walls of the insert core comprising a system of sliding surfaces in order to cause the retaining pieces to pivot during an axial movement of the bolt.

Furthermore, French Patent Specification 2,152,941 describes a first device with retaining elements which are mounted such that they can rotate around a pin arranged in a stationary manner in the housing. This device does not have any bolt or any screw which engages in the bolt via sliding surfaces; rather the retaining elements are pivoted by an eccentric whose height corresponds to the width of the housing. The housing does not have any sliding surfaces which cause the retaining elements to pivot as they move axially; rather the sliding surfaces are located in the eccentric and in the lower region of the retaining elements or of a pressure-exerting piece which displaces the retaining elements. In the case of a second device described in the abovementioned French patent specification, a bolt is mounted transversely in the housing and forms the sliding surfaces for pivoting the retaining elements.

Finally, flat latches with bent-over ends functioning as hooks are known from EP-0 238 848 B1.

Taking this prior art as the departure point, the object of the invention is to improve the clamping device mentioned in the introduction such that it is subjected to essentially symmetrical loading, may be of flatter configuration and also has good clamping properties.

The object of the present invention, then, is to provide an improved clamping device of the type mentioned in the introduction.

This object is achieved according to the invention by a clamping device with the features specified in the characterizing part of Patent claim 1.

Further advantageous configurations of the invention are specified in the dependent claims.

The invention is explained in more detail hereinbelow, by way of example, with reference to a drawing, in which.

Figure 1:
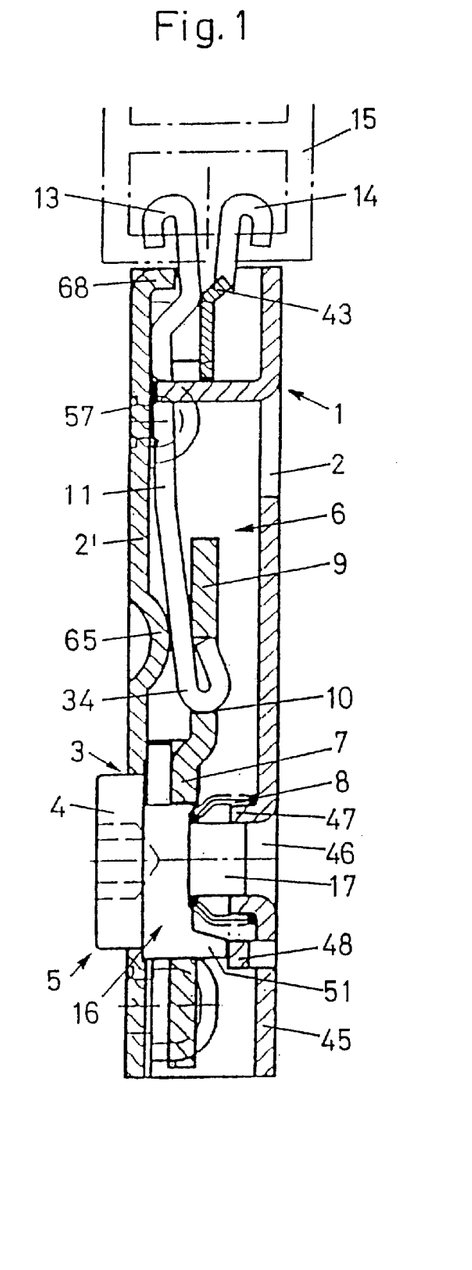
FIG. 1 shows a sectional illustration, through an eccentric axis, of a novel clamping device with insert core in the closed state.

FIG. 1 shows an insert core 1, for example consisting of sheet metal, which has been pushed into a first profile piece (not illustrated) and secured there and has a base part 2 and a cover 2'. The cover 2' of the insert core 1 is provided with a transverse bore 3 for receiving the head 4 of an eccentric 5. Located between the base part 2 and the cover 2' is an elongate interior space 6 for receiving a preferably non-elastic and/or rigid anchor or slide 7, which may be produced by a diecasting process or, preferably, as a stamped element.

The profile piece may also be designed, for example, similarly to the corresponding elements described in CH-A-576 591 or EP-B1-0 506 607 or EP-B1-0 123 683.

The anchor 7 is arranged displaceably in the interior space 6, it also being the case that a helical spring 8, which is only indicated in FIG. 1, is located in a space 54 (FIG. 14) between the eccentric and the base part 2.

Figure 2:
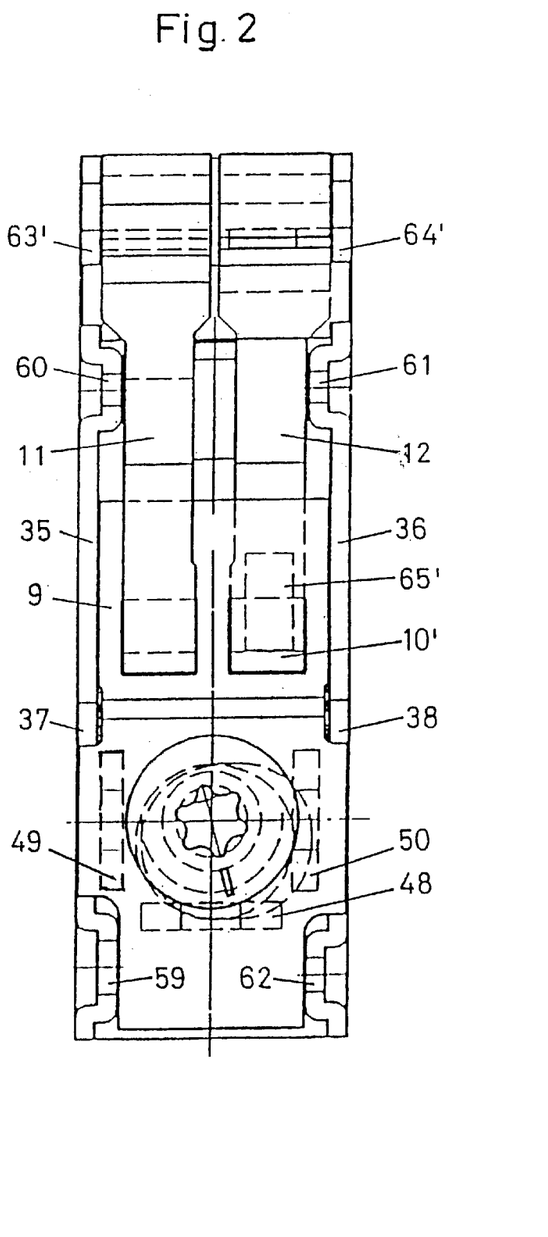
FIG. 2 shows a plan view of part of this clamping device and of its slide in the closed state.

FIG. 2 shows that the slide 7 is of a wide, flat design and has an upper coupling section 9 with two rectangular openings 10, 10' which serve for the pivotable mounting of retaining pieces or latches 11, 12, which are also referred to as clamping elements. Such retaining pieces have a nose 13, 14 (FIG. 1) which functions as a clamping hook and can be introduced into an opening of a profile piece 15 in order to exert a clamping pressure on that section of this profile piece 15 which partially closes off the opening, it being possible for these latches 11, 12 to be arranged in a non-alternating manner (FIG. 2) or in an alternating manner (FIG. 1) with the nose 13, 14 in one direction or the other. The eccentric 5 of the clamping device has a relatively high eccentric head 4, an eccentric roller 16 arranged eccentrically with respect to the eccentric head 4, and a shaft 17 coaxial with the eccentric head.

Figure 3:
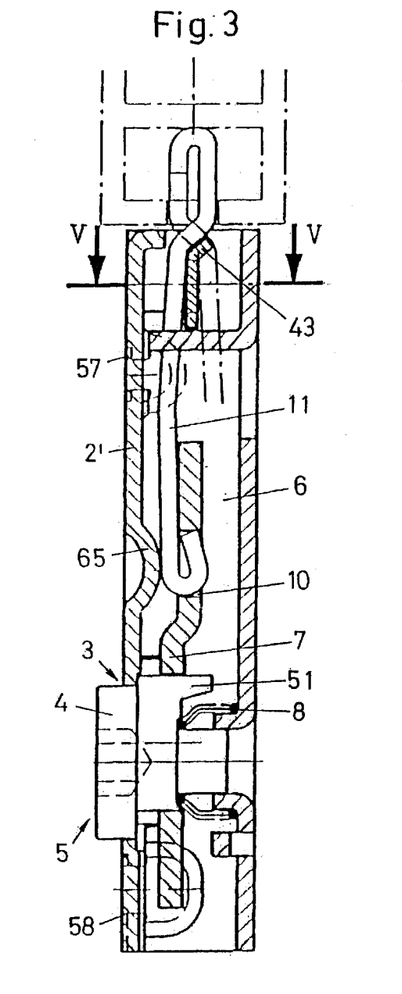
FIG. 3 shows a sectional illustration, through an eccentric axis, of a novel clamping device with insert core in the open state.
Figure 4:
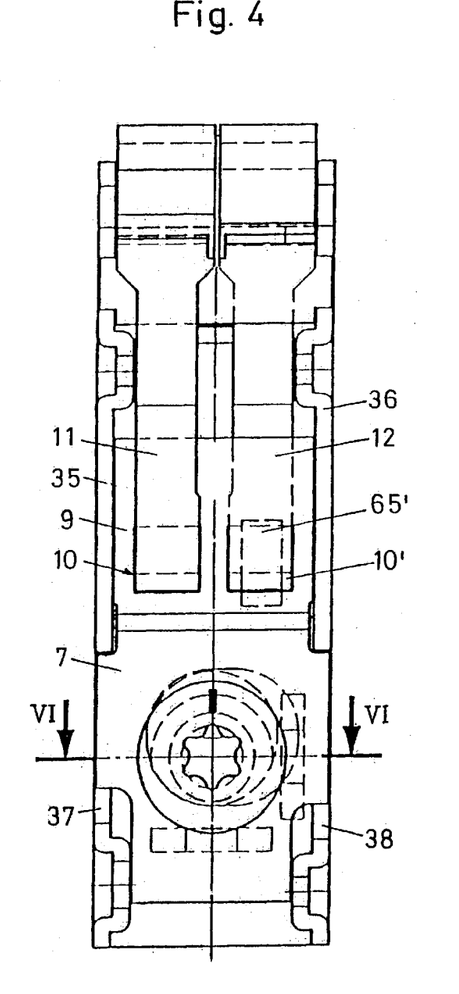
FIG. 4 shows a plan view of part of this clamping device and of its slide in the open state.
Figure 5:
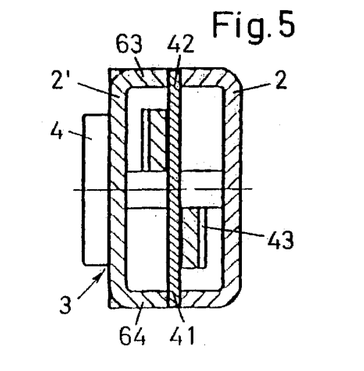
FIG. 5 shows a sectional illustration along line V—V in FIG. 3.
Figure 6:
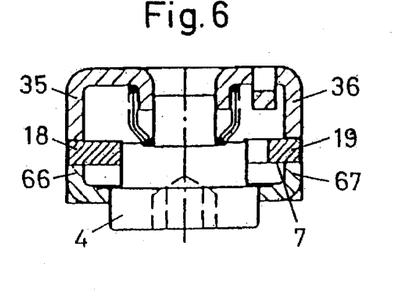
FIG. 6 shows a sectional illustration along line VI—VI in FIG. 4, FIGS. 7 and 8 show illustrations of such a slide.

FIGS. 3 and 4 show the clamping device in the open state, and it can be seen from FIGS. 5 and 6 that the eccentric head 4 projects some way out of the opening 3 of the cover 2'.

Figure 7:
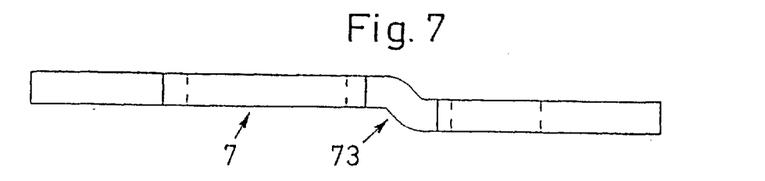
Figure 8:
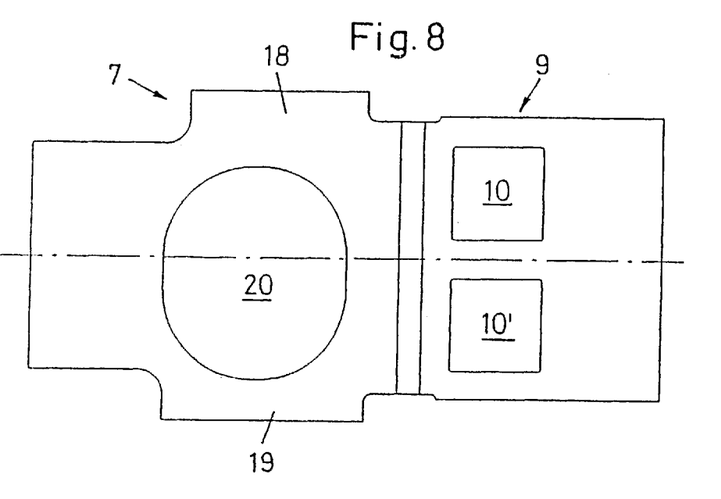

The slide 7 according to FIGS. 7 and 8 basically comprises a plate-like piece with a central part which has two short, outwardly extended parallel border strips 18, 19 and an opening 20 in the form of an asymmetric slot which is extended to the right and to the bottom in FIG. 8.

Figure 9:
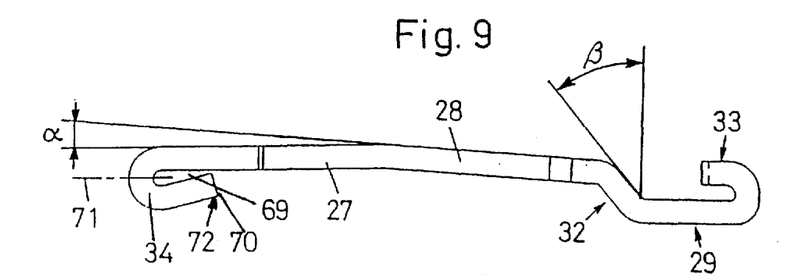
FIG. 9 shows a side view of a novel latch.
Figure 10:
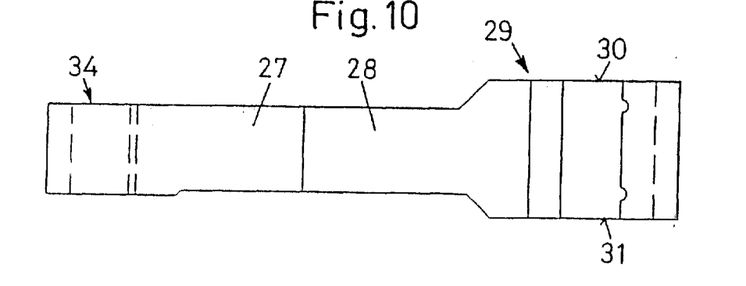
FIG. 10 shows a plan view of a novel latch.

The latches 11, 12 according to FIGS. 9 and 10 basically comprise an elongate plate-like piece. Such a latch is bent in the central region by a small angle α of approximately 5° and thus defines a lower, essentially straight latch part 27 and a higher, essentially straight latch part 28 which comprises an upper end section 29 which has a widened border section 30, 31 on the left and right in each case. The relationship $1° \leq \leq 10°$ may apply, for example, for the angle . The end section 29 with the border sections 30, 31 comprises a transition section 32 which is offset to the right by a first bend at an angle β of preferably 30° to 50° (FIG. 9) and is offset to the left, by a second bend of approximately the same angle β, into a plane which runs approximately parallel to the broad side of the latch part 27. The end region of the upper end section 29 of the upper latch part 28 is bent over to the left by approximately 180° in FIG. 9 in order to form a first hook or clamping hook 33. In contrast, the end region of the lower latch part 27 is bent over to the right by an angle of 180° in FIG. 9 in order to form a second hook 34 or hinge hook.

The hinge hook 34 of the latch is accommodated loosely, but with little play, in the preferably rectangular opening 10 of the slide 7, to be precise such that the latch can be pivoted at least by a small angle. The slide 7 is arranged displaceably between two lateral, elongate wall sections 35, 36 (FIG. 2) of the base part 2. For this purpose, the wall sections 35, 36 each have an elongate openings 37 and 38, respectively, in the case of which the end side of the wall section in each case forms a sliding surface for the extended border section 18, 19 of the slide 7. The openings 37, 38 are longer than the border sections 18, 19 by an amount which thus defines and/or delimits a displacement path.

Figure 11:
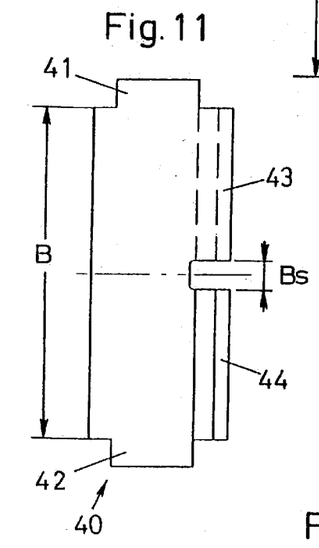
FIGS 11 to 13 show illustrations of a special crosspiece according to the invention.
Figure 12:
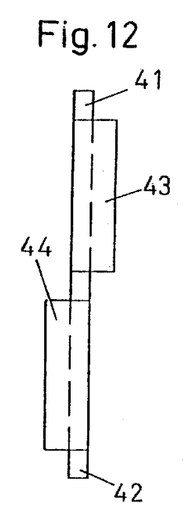
Figure 13:
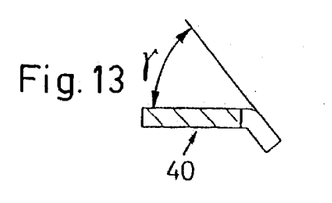

The crosspiece 40 according to FIG. 11 is of elongate design and, at each of its two ends, has a short extension 41 and 42, the latter serving for fastening the crosspiece in corresponding openings of the narrow side walls of the clamping device. In FIG. 11, the narrow elongate border of the crosspiece has two extensions 43, 44, each of which is shorter than half the length B of the outer elongate edge of the crosspiece 40, the length B preferably corresponding to the width of the interior space of the clamping device. In FIG. 11, one extension 43 is angled downwards and the other extension 44 is angled upwards, to be precise at an angle α of approximately 45° to 55° in each case. FIG. 11 shows that the extensions 43 and 44 are separated by an interruption in the width Bs.

The base 45 (FIG. 1) of the base part 2, which is preferably approximately U-shaped in cross-section, has a round opening 46 with an interior annular bead 47. Located between the bead 47 and the wall sections 35, 36, in the interior of the base 45, is an elevation 48 which is embossed between two parallel incisions and runs transversely with respect to the movement direction of the slide. In that region of the wall 35 or 36 which is adjacent to the opening 46, the base 45 likewise has in each case one interior protrusion 49 or 50, respectively, which is embossed in a hump-like manner.

Figure 14:
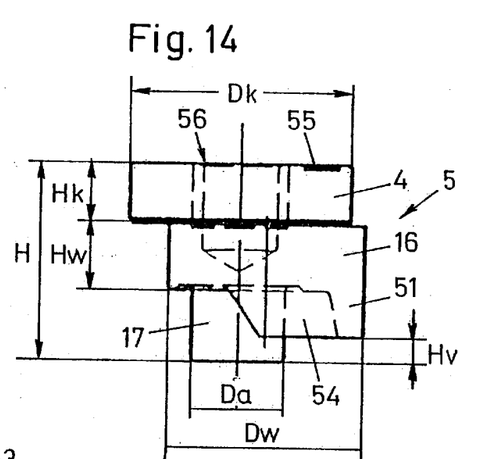
FIGS. 14 to 16 show illustrations of a special eccentric according to the invention.
Figure 15:
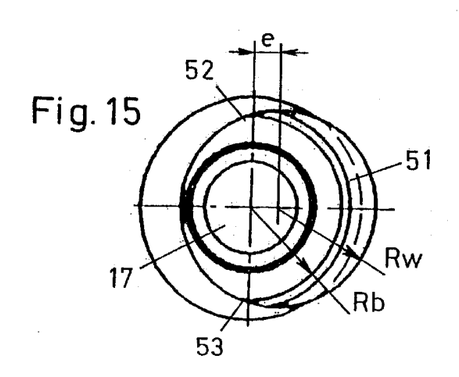
Figure 16:
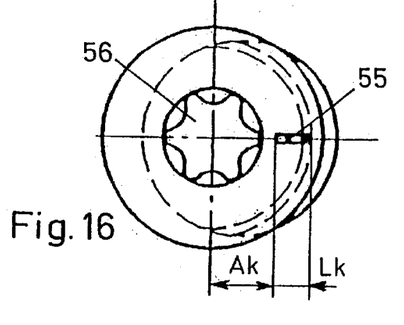

The eccentric 5 with an overall height H according to FIGS. 14 to 16 comprises the abovementioned eccentric head 4 with diameter Dk and height Hk, the eccentric roller 16 with diameter Dw and the eccentric shaft 17 with diameter Da. The eccentric roller 16 is designed eccentrically in one piece with the eccentric head, the corresponding eccentricity being designated by e in FIG. 15. The eccentric roller has an approximately moon-shaped wall 51, with two moon points 52, 53, which is formed on the inside by an annular bore 54 concentric with the eccentric head 4. The eccentric shaft 17 is formed concentrically in the interior space of this bore 54, from which it projects with a height Hv. The eccentric roller 16 as a whole has a height Hw. In FIG. 15, the moon-shaped wall 51 is illustrated clearly between a circle with radius Rw=Dw/2 and an arc, with the radius Rb, of the bore 54. The end side of the eccentric head 4 is provided with a marking 55, of which the inner end point is located at a distance Ak from the geometrical axis of rotation of the eccentric head 4, which, according to FIG. 16, also has a tool-engagement surface 56 on its end side for the purpose of transmitting a torque.

The cover 2' (FIGS. 1 and 3) basically comprises a plate-like piece which, in addition to the round bore 3 for the eccentric head 4, has four small openings 57, 58, ... which interact with protrusions 59, 60, 61 and 62 (FIG. 2) of the base part 2. When the cover 2' is mounted by virtue of the protrusions 59, 60, 61, 62 being introduced into the four openings 57, 58, ..., the housing can be closed by riveting at the production stage.

In the region between the opening 57 and the upper cover end, the cover 2' has, on the right and left in each case, an extension 63 and 64 (FIG. 5), which are each angled in the form of a lug and interact with in each case one corresponding cutout 63', 64' (FIG. 2) in the side walls 35, 36 of the base part 2 in order to secure therebetween the extensions 41 and 42 (FIG. 5), respectively, of the crosspiece 40.

Located in the region of the cover, opposite the opening 10 of the slide 7, is an interior elevation 65 which is embossed in a hump-like manner between two parallel incisions and runs parallel to the movement direction of the slide 7. Analogously to this, there is located in the region of the base part, opposite the opening 10' of the slide 7, an interior elevation 65' which is embossed in a hump-like manner between two parallel incisions and likewise runs parallel to the movement direction of the slide 7.

In the region in the vicinity of the guide openings 37 and 38, the cover 2' has, on the right and left in each case, an extension 66, 67 (FIG. 6), which are each angled in the form of a lug and interact with in each case one of the corresponding cutouts in the side walls 35, 36 of the base part 2 in order to guide therebetween the borders 18 and 19 (FIG. 8) of the slide 7.

The embodiment according to the FIGS. 1 to 16 of the novel clamping device functions as follows:

The latches 11 and 12 are preferably identical. The hinge hook 34 of the latch 11 is mounted in the opening 10 from above, while the hinge hook of the latch 12 is mounted in the opening 10' from beneath. In the open state (FIG. 3), the slide 7 has been forced outwards, and the two clamping hooks of the latches 11 and 12 project, parallel to one another, out of the housing formed by the base part 2 and the cover 2'.

In this state, the eccentric 5 can be forced, counter to the action of the helical spring 8, through the opening 3 of the cover 2' into the housing, at least until the end face of the eccentric head 4 is in alignment with the outer surface of the cover 2', because the moon-shaped wall 51 has a free movement path in this position. However, without external pressure, the spring 8 acts such that the head 4 projects out of the bore 3, which is useful for clamping the clamping device in the first profile piece.

During rotation of the eccentric 5, the eccentric roller 16 presses against the border 4 of the opening 20 of the slide 7, with the result that the slide 7 is forced inwards, and the ramps of the regions 32 (FIG. 9) of the latches slide against the inclined surfaces 43, 44 of the crosspiece 40, with the result that the latches are pivoted outwards, and the clamping device is then closed or secured. In the closed state, the moon-shaped wall 51 of the eccentric roller 16 is supported on the protrusion 48, with the result that the eccentric head 4 projects some way out of the housing and thus also remains clamped in captive fashion in a corresponding opening of the first profile piece. In the open state, however, the moon-shaped wall 51 of the eccentric roller 16 is more remote from the protrusion 48, with the result that the eccentric 5 can be forced, counter to the action of the spring 8, into the interior of the housing, which permits the clamping device to be freed from the first profile piece.

The clamping device is opened by rotating the eccentric head 5 in the other direction. The elevations 65, 65' are arranged such that the latches are forced inwards during the resulting movement, that is to say they are shifted into the straight position. In order better to retain the latches in the closed position, the ends of the cover 2' and of the base part 2 may each have an angled extension 68 (FIG. 1) at these locations.

The hinge hook 34 may be of a preferably flat design and have, between its two bent-over parts, as small an air gap 69 as possible, the latter being smaller than half the thickness, for example a third of the thickness, of the strip-like part 27, 28 of the clamping element.

The system of sliding surfaces which displaces the slide axially may also be the system which is known from CH-576 591 and has a screw whose conical tip interacts eccentrically with a conical recess, serving as tightening surface, in a bolt installed in the slide.

The various parts are preferably produced by being stamped from sheet steel with a thickness of 0.5 to 3 mm, for example 1.0 to 2.5 mm. The various pieces may be hardened and/or galvanized. The eccentric 5 preferably consists of high-strength steel. The end face 70 of the hinge hook 34 may form an angle of other than 90° with the symmetry plane 71 of the hinge hook 34, to be precise preferably with a protruding outer edge 72.

The clamping device may also, for example, have three or more alternating latches, of which the hinge hooks are accommodated in each case in a corresponding opening 10 of the slide 7.

Between its central part and its coupling section, the slide 7 preferably has a connecting section 73 which is bent in the manner of a step, such that the central part and the coupling section define two at least approximately parallel reference planes which are spaced apart by the order of magnitude of the thickness of the clamping element.

Figure 17:
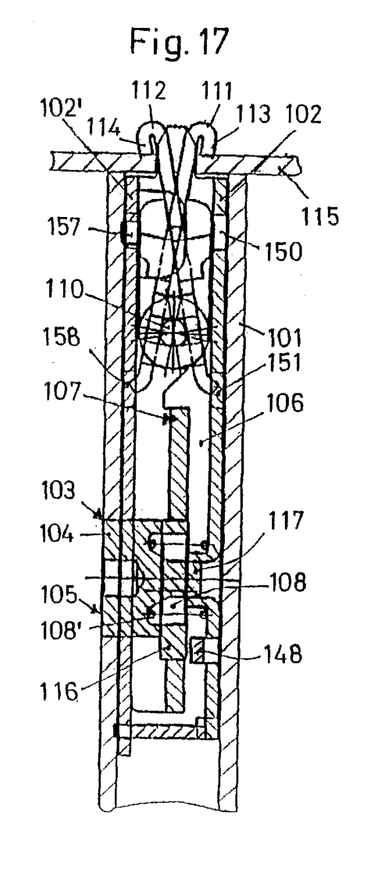
FIG. 17 shows a sectional illustration, through an eccentric axis, of a novel clamping device with insert core in the closed state.

FIG. 17 shows an insert core 102, for example consisting of sheet metal, which has been pushed into a first profile piece 101 and secured there. The cover 102' of the insert core 102 is provided with a transverse bore 103 for receiving the head 104 of an eccentric 105 and with an elongate interior space 106 for receiving a preferably non-elastic and/or rigid anchor or slide 107, which may be produced by a diecasting process or, preferably, also as a stamped element.

The profile piece 101 may, for example, be similar to the corresponding elements described in CH-A-576 591 or EP-B1-0 506 607 or EP-B1-0 123 683.

The anchor 107 is mounted displaceably in the interior space 106, it also being the case that a helical spring 108' or plate spring, which is only indicated in FIG. 17, may be accommodated partially in a base-side inner bore 108 of the eccentric 105.

Figure 18:
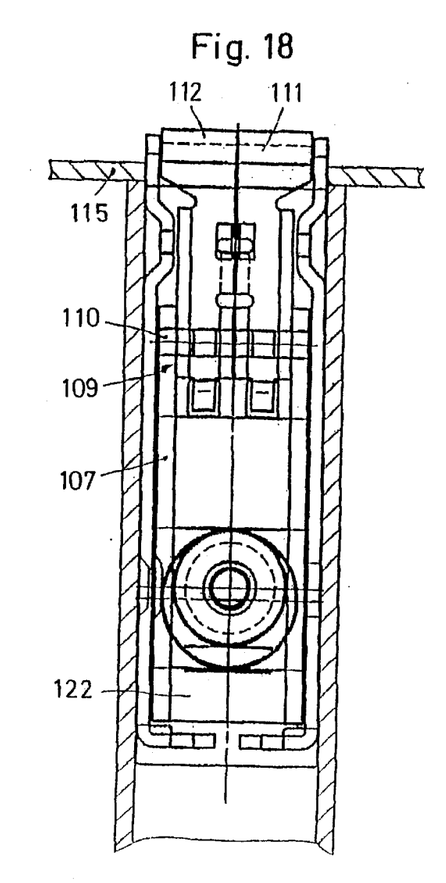
FIG. 18 shows a plan view of part of this clamping device and of its slide.
Figure 19:
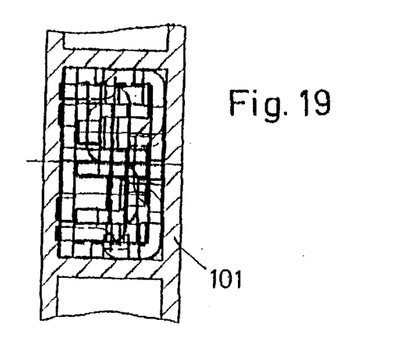
FIG. 19 shows a sectional illustration of the eccentric section of this clamping device in a plane transverse to the longitudinal axis.

FIG. 18 shows that the slide 107 is of a wide, flat design and has an upper coupling section 109 which bears a shaft 110 which serves for the pivotable mounting of retaining pieces or latches 111, 112. Such retaining pieces are known per se and have a nose 113, 114 (FIG. 17) which can be introduced into an opening of a profile piece 115 in order to exert a clamping pressure on that section of this profile piece 115 which partially closes off the opening, it being possible for these latches 111, 112 to be stacked in a non-alternating manner (FIG. 18) or in an alternating manner (FIG. 17) with the nose 113, 114 in one direction or the other.

The eccentric 105 of the clamping device has a relatively high eccentric head 104 with diameter d, an eccentric roller 116 arranged eccentricaily with respect to the eccentric head 104 and having a diameter D, and a shaft 117 which is coaxial with the eccentric head and projects out of the base-side inner bore 108 of the eccentric 105, where D>d.

Figure 20:
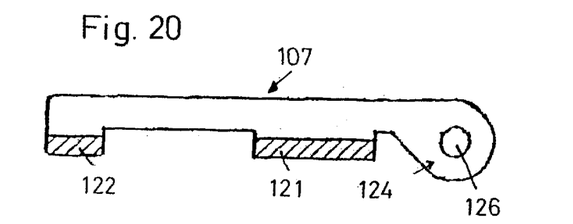
FIGS. 20 to 22 show illustrations of such a slide.
Figure 21:
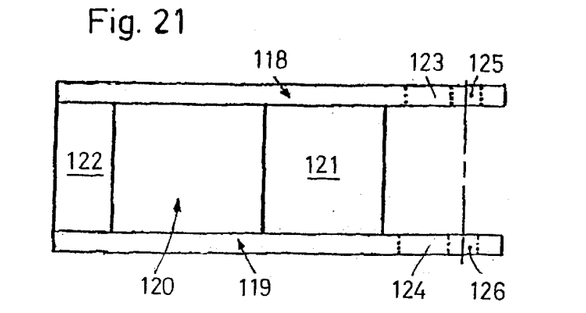
Figure 22:
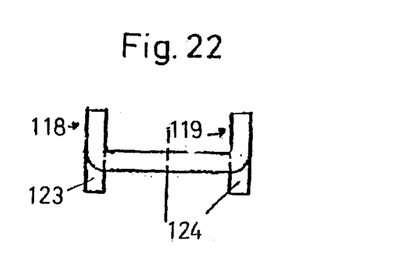

The slide 107 according to FIGS. 20 to 22 basically comprises an elongate plate-like piece with two parallel, angled border strips 118, 119. The base of the slide 107 has a preferably rectangular opening 120 between two flat base sections 121, 122 and the two border strips 118, 119. The upper end region of the strips 118, 119 is designed in each case with a rounded, lug-like extension 123, 124, the latter each having a bore 125, 126 for the purpose of mounting the shaft 110, which can thus be mounted transversely with respect to the movement direction of the slide. According to FIG. 20, the extensions 123, 124 of the upwardly angled border strips 118, 119 are oriented downwards, this resulting in an approximately H-shaped configuration (FIG. 22) for the end side of the slide 107.

Figure 23:
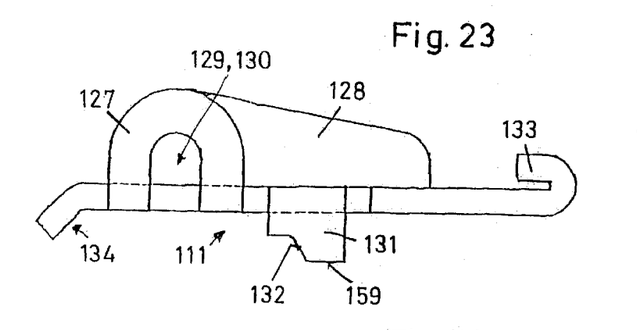
FIG. 23 shows a side view of a novel latch.
Figure 24:
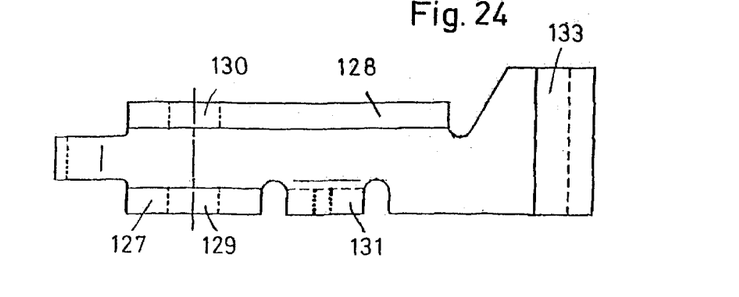
FIG. 24 shows a plan view of a novel latch.
Figure 25:
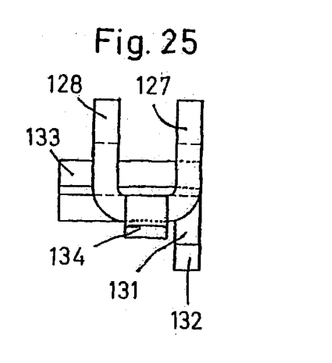
FIG. 25 shows a front view of this latch.

The latch 111 according to FIGS. 23 to 25 basically comprises an elongate plate-like piece with two parallel, widened border sections 127, 128 which are angled upwards. The upper part of the border section 127 is of semicircular design while the upper part of the border section 128 is extended in the form of a trapezium with two rounded corners. The border sections 127, 128 each have a partially round opening 129 or 130, respectively, these openings being arranged coaxially and transversely with respect to the movement direction of the slide, in order to mount the latch on the shaft 110.

Opposite the border section 128, the latch has an extended border section 131 which is angled downwards and is provided with a ramp 132 which runs downwards to the right (FIG. 23). The right-hand end section of the latch on the far side of the trapezium 128 is lengthened upwards to the right (FIG. 24), and the end region of this end section is bent over upwards by approximately 180° in order to form a hook 133. In contrast, the lengthened portion of the left-hand end section of the latch on the far side of the higher regions of the border sections 127, 128, in which the openings 129, 130 are located, is of a narrow design and is bent downwards at an angle to form an inclined surface 134.

Figure 26:
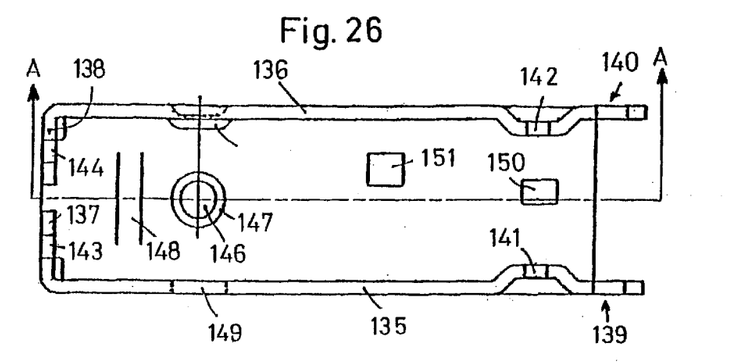
FIG. 26 shows a plan view of the lower housing of this embodiment.
Figure 27:
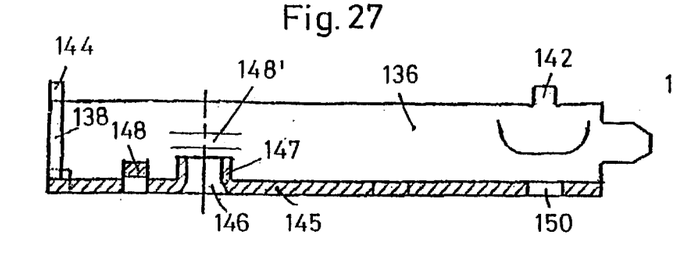
FIG. 27 shows a sectional illustration along line A—A in FIG. 26.
Figure 28:
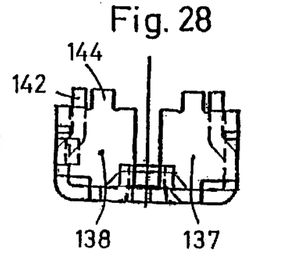
FIG. 28 shows a front view of the housing.

The housing or chassis according to FIGS. 26 to 28 basically comprises an elongate plate-like piece with two parallel, extended border sections 135, 136 which are angled upwards and have end sections 137, 138 which are widened in the left-hand end region and are angled on the interior in order to form an approximately U-shaped, virtually closed outer wall of the housing.

In their right-hand, open end region, the walls 135, 136 each preferably have a tongue-like extension 139, 140 as a protection or covering for the latch hooks. In these end regions, but before these extensions, the upper end sections of the walls 135, 136 are pressed in in the form of humps and are each provided with a protrusion 141, 142. The end sections 137, 138 are also each provided with an upwardly oriented protrusion 143, 144.

The base 145 of the housing has a round opening 146 with an interior annular bead 147. Located between the bead 147 and the wall sections 137, 138, in the base 145, is an elevation 148 which is embossed, in the direction of the interior, between two parallel incisions and runs transversely with respect to the movement direction of the slide. In that region of the wall 136 which is adjacent to the bore 146, said wall 136 has an interior protrusion 148' which is embossed in a hump-like manner and, opposite this protrusion 148', the other wall 135 has a rectangular opening 149. In that region of the base 145 which is adjacent to the protrusions 141, 142, said base 145 has a rectangular opening 150. In a central region between the opening 150 and the bore 146, the base 145 has a further rectangular opening 151, which is preferably located closer to the opening 150 than to the bore 146. While the protrusion 148 and the bead 147 are located symmetrically with respect to the symmetry plane of the housing, the center points of the openings 150 and 151 are respectively at a distance a and b from this symmetry plane, where b>a.

Figure 29:
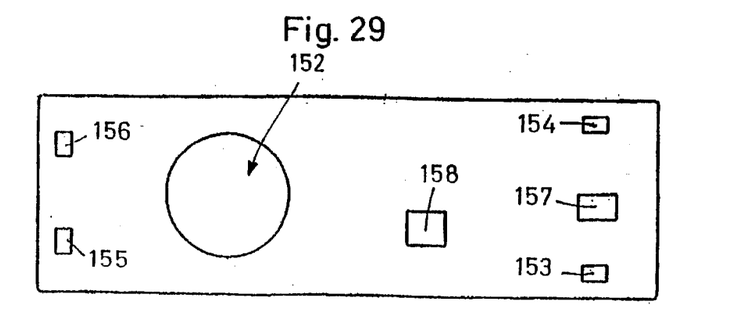
FIGS. 29 and 30 show illustrations of a cover for this housing.
Figure 30:
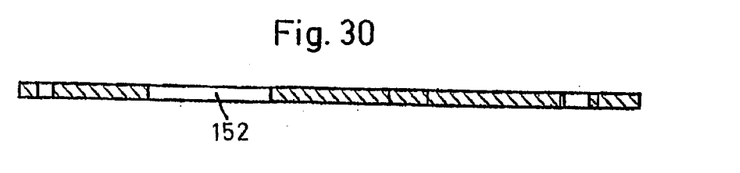

The cover according to FIGS. 29 and 30 basically comprises a plate-like piece with a relatively large round bore 152 for the eccentric head, with four small openings 153, 154, 155, 156 for the protrusions 141, 142, 143 and 144, and with an opening 157 and 158 for respectively the same functions as the openings 150 and 151.

The openings 151 and 158 are thus of the same size and preferably somewhat larger than the openings 150 and 157, which are also the same size as each other.

When the cover is mounted by virtue of the protrusions 141, 142, 143, 144 being introduced into the openings 153, 154, 155, 156, the housing can be closed by riveting at the production stage. In the closed state, the openings 150, 157 and 151, 158 are located in a symmetrical position with respect to the symmetry plane of the housing.

The embodiment according to FIGS. 17 to 30 of the novel clamping device functions as follows:

In the open state, the end 159 of the border section 131 of the latch (FIG. 23) latches into the opening 150 or 157 of the housing or of the cover, respectively. During rotation of the eccentric 105, the eccentric roller 116 presses against the border of the base section 122, with the result that the slide 107 is forced inwards, and the ramp 132 (FIG. 23) slides against the border of the opening 150 or 157, with the result that the latch is pivoted outwards. During this movement, the inclined surface 134 (FIG. 23) latches into the corresponding opening 151 or 158, and the clamping device is closed or secured. In the closed state, the eccentric roller 116 is supported on the protrusion 148, with the result that the eccentric head 104 projects some way out of the housing and thus also remains clamped in the opening 103 of the profile piece 101. In the open state, however, the eccentric roller 116 is more remote from the protrusion 148, with the result that the eccentric 105 can be forced, counter to the action of the spring 108', into the housing and out of the opening 103, which permits the clamping device to be freed from the profile piece 101.

The system of sliding surfaces which displaces the slide axially may also be the system which is known from CH-576 591 and has a screw whose conical tip interacts eccentrically with a conical recess, serving as tightening surface, in a bolt installed in the slide.

The various parts are preferably produced by being stamped from sheet steel with a thickness of 1 to 3 mm, for example 1.5 to 2.5 mm. The various pieces may be hardened and/or galvanized. The eccentric preferably consists of high-strength steel.

The insert core 102 preferably has, at least in part, two broad and two narrow outer walls, rotary means being provided in a first of said two broad outer walls in order, via a system of sliding surfaces which engage in the slide, to displace the latter axially.

The slide 107 and/or the housing of the insert core 102 and/or the clamping element 111 is or are preferably designed in the form of plates with angled borders.

The slide 107 may have at least one angled strip 118 or 119 with a lug-like extension 123 or 124, respectively, which respectively comprise means 125 and 126 in order to secure at least one clamping element pivotably.

The slide may have two upwardly angled border strips 118 or 119 with downwardly oriented, lug-like extensions 123 and 124, this resulting in an approximately H-shaped configuration for the end side of the slide 107, these extensions 123 or 124 each respectively having a bore 125 or 126 for the purpose of mounting a shaft 110, which is provided for pivotably retaining at least one clamping element.

The clamping element may have an angled strip with an end-side T-shaped or G-shaped extension as a hook.

The clamping element may be an elongate plate-like latch with at least one elongate border section 127 and 128 angled upwards to the side, with a downwardly angled border section 131 which has a ramp 132, with a first end region designed in the form of a hook 133, and with a bent second end region 134.

The latch may comprise two parallel elongate border sections 127 and 128 which are angled upwards to the side and each respectively have an opening 129 and 130 for the purpose of mounting the shaft 110, which is provided for pivotably retaining the latch on the slide.

The first end region 133 of the latch 111 may be bent over upwards by approximately 180°, and the second end region 134 may be bent downwards at an angle.

The insert core 102 may comprise a cross-sectionally U-shaped housing and a plate-like cover 102'.

The housing and/or the cover may respectively have an opening 150 or 157 which is provided for partially receiving the border section 131, provided with the ramp 132, of the latch 111.

The cover 102' and/or the housing may respectively have an opening 151 or 158 which is provided for partially receiving the bend second end region 134.

The system of sliding surfaces which displaces the slide axially may be an eccentric system which comprises either an eccentric roller or a screw whose conical tip interacts eccentrically with a conical recess, serving as tightening surface, in a bolt which is installed in the slide.

What is claimed is:

1. A clamping device for the releasable connection of two profile pieces, the clamping device comprising:

an insert core to be introduced and fixed in a first of the profile pieces;

a slide provided in the insert core for movement in a longitudinal direction; and two clamping elements hinge coupled to the slide, for pivoting on the slide, the two clamping elements pivoting independently with respect to each other, and each of the two clamping elements having a clamping hook to be introduced into an opening of a second profile piece in order to exert a clamping pressure on the second profile piece;

wherein the insert core includes (1) rotary means with a first sliding surface which engages with the slide, to displace the slide longitudinally, and (2) a second sliding surface that displaces the two clamping elements transversely during longitudinal displacement, and wherein, during longitudinal displacement of the slide, the two clamping elements pivot around a transverse axis, without rotating about a longitudinal axis.

2. The clamping device according to claim 1, wherein each of the clamping elements includes an elongate part from one end of which extends the clamping hook, and from another end of which extends a hinge hook that is oriented opposite to the clamping hook, the hinge hook being received in an aperture provided in the slide.

3. The clamping device according to claim 2, wherein the hinge hook has two bent-over parts that are spaced apart a distance which is smaller than half the thickness of the elongate part.

4. The clamping device according to claim 2, wherein the elongate part has two sections which are connected together to form an angle.

5. The clamping device according to claim 2, wherein the hinge hook has an end face that forms an angle of other than 90° with a symmetry plane of the hinge hook, and has a protruding outer edge.

6. The clamping device according to claim 2, wherein each of the clamping elements includes a ramp-like section provided between the elongate part and the clamping hook, and the second sliding surface is formed by a crosspiece having ends fastened to the insert core, and wherein the ramp-like section slides across the crosspiece when the slide is longitudinally displaced.

7. The clamping device according to claim 6, wherein the insert core comprises a base part and a cover, and the base part has an incision interacting with an extension of the cover to fasten therebetween the ends of the crosspiece.

8. The clamping device according to claim 1, wherein the slide has a connecting section which is bent in a step-like manner.

9. The clamping device according to claim 1, wherein the insert core has four outer walls, and the rotary means is provided through an aperture in one of the four outer walls.

10. The clamping device according to claim 1, wherein the insert core comprises a housing having a U-shaped cross-section and a cover mounted on the housing.

11. A clamping device comprising:

an insert core;

a slide mounted in the insert core for movement in a longitudinal direction;

two clamping elements hinge coupled to the slide, for pivoting on the slide, the two clamping elements pivoting independently with respect to each other; and a cam mounted for rotation on the insert core, the cam having a first sliding surface engaged with the slide to displace the slide in the longitudinal direction;

wherein the insert core includes a second sliding surface across which the clamping elements slide during longitudinal displacement of the slide, such that the clamping elements pivot around a transverse axis, without rotating about a longitudinal axis.

12. The clamping device according to claim 11, wherein each of the clamping elements includes a hinge hook received in an aperture provided in the slider.

13. The clamping device according to claim 11, wherein each of the clamping elements includes a ramp-like section that slides across the crosspiece when the slide is longitudinally displaced.

14. The clamping device according to claim 11, wherein the second sliding surface is formed by a cross piece that extend transversely across the insert core.

15. The clamping device according to claim 11, further comprising a shaft supported on the slide, the shaft supporting the clamping elements.

16. The clamping device according to claim 11, wherein the insert core has a wall through which a hole is formed, an edge of the wall defining the hole forms the second sliding surface.

17. A clamping device comprising:

an insert core;

a slide mounted in the insert core for movement in a longitudinal direction only;

a clamping element hinge coupled to the slide; and a cam mounted for rotation on the insert core, the cam having a first sliding surface engaged with the slide to displace the slide in the longitudinal direction;

wherein the insert core includes a second sliding surface across which the clamping element slides during longitudinal displacement of the slide, such that the clamping element pivots around a transverse axis, without rotating about a longitudinal axis.

18. The clamping device according to claim 17, wherein two clamping elements are hinge coupled to the slide.

19. The clamping device according to claim 17, wherein each of the clamping elements includes a hinge hook received in an aperture provided in the slider.

20. The clamping device according to claim 17, further comprising a shaft supported on the slide, the shaft supporting the clamping element.

* * * * *